United States Patent [19]
Siler

[11] Patent Number: 5,823,055
[45] Date of Patent: Oct. 20, 1998

[54] WORM GEAR DRIVE LOCKING APPARATUS

[75] Inventor: G. Daniel Siler, Dayton, Ohio

[73] Assignee: Dayton Machine Tool Company, Dayton, Ohio

[21] Appl. No.: 751,860

[22] Filed: Nov. 18, 1996

[51] Int. Cl.$^6$ .............................. F16H 1/16; F16H 35/06
[52] U.S. Cl. ................... 74/425; 74/396; 74/398
[58] Field of Search ............................ 74/425, 409, 396, 74/411.5; 192/4 R

[56] References Cited

U.S. PATENT DOCUMENTS

| | | | |
|---|---|---|---|
| 2,771,169 | 11/1956 | Wahlstrom | 74/396 X |
| 3,463,030 | 8/1969 | Nuccel | 74/396 X |
| 3,762,234 | 10/1973 | Hoglund | 74/409 |
| 4,220,053 | 9/1980 | Barlow et al. | 74/425 |
| 4,653,739 | 3/1987 | Moore | 74/425 X |
| 4,790,202 | 12/1988 | Hayashi et al. | 74/396 |
| 4,796,479 | 1/1989 | Wisecaryer | 74/396 X |
| 4,843,904 | 7/1989 | Moore . | |

*Primary Examiner*—Rodney H. Bonck
*Assistant Examiner*—Marcus Charles
*Attorney, Agent, or Firm*—Jacox, Meckstroth & Jenkins

[57] ABSTRACT

A worm gear is connected to a machine tool component and has teeth mating with teeth on a power driven worm rotatably supported by a housing enclosing the worm. A clamping shoe is supported for sliding movement within a slot in the housing and has a compound curved inner surface positioned to engage the teeth on the worm. A cam shaft is supported for rotation by the housing and extends laterally through a hole within the clamping shoe. A fluid cylinder is connected to rotate the cam shaft for moving the clamping shoe radially between a released position and a clamping position pressing the teeth on the worm against the teeth on the worm gear by slightly deflecting the worm to lock the head from any movement.

17 Claims, 1 Drawing Sheet

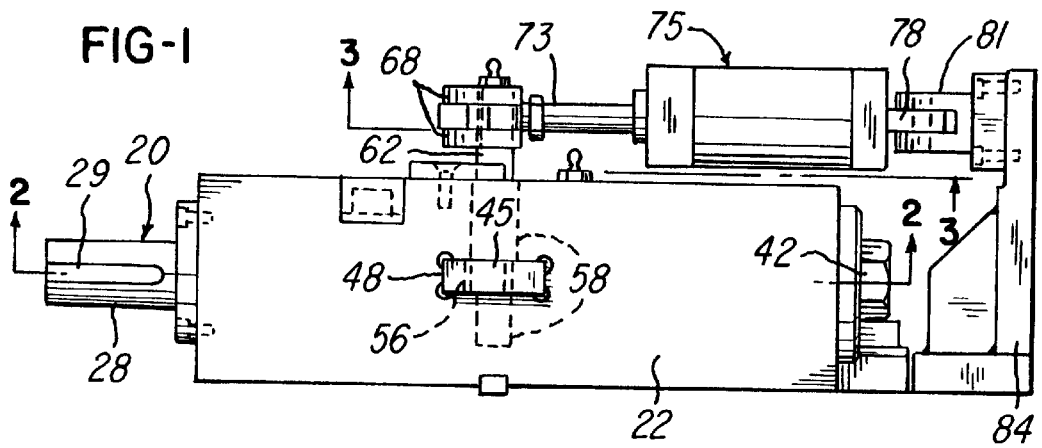
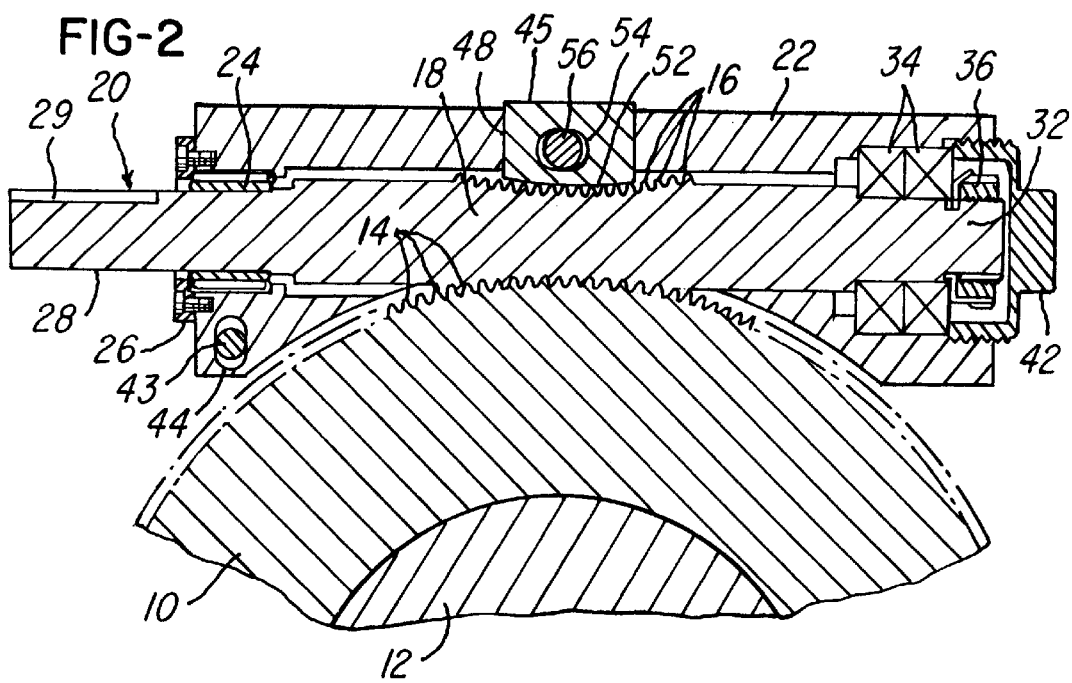
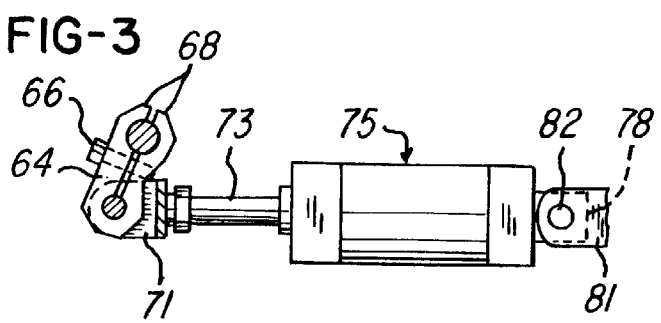

5,823,055

WORM GEAR DRIVE LOCKING APPARATUS

BACKGROUND OF THE INVENTION

In the construction of a machine tool having a CNC controlled spindle head supported for movement on different axes, it is common to use worm gear drives for independently rotating a component such as the spindle head. After the component has been positioned on its axes, it is important to prevent any movement of the component during the machining operation in order for the part to be machined with close tolerances.

One device for locking a worm gear drive is disclosed in Moore U.S. Pat. No. 4,843,904 wherein one end portion of a power driven worm is supported by a spherical bearing. The opposite end portion of the worm is shifted laterally in response to actuation of a solenoid controlling a fluid cylinder for pivoting the worm until the worm teeth are in pressure engagement with the worm gear teeth. When the worm teeth and the worm gear teeth are in such pressure engagement, the worm gear is restrained from rotating since there is no backlash between the worm teeth and the gear teeth.

SUMMARY OF THE INVENTION

The present invention is directed to an improved device or apparatus for locking a shaft or member from rotation by a worm gear drive. The apparatus of the invention is ideally suited for use on machine cutting tools which are subject to vibration when cutting metal, and assures that the cutter head does not move from its selected position during the cutting operation. The worm drive of the invention may also be used for locking any rotary member on a machine and which is rotated by a worm gear drive.

In accordance with one embodiment of the invention, a worm gear drive includes a housing supporting a worm for rotation, and the worm has an hour-glass center portion with precision helical threads engaging mating precision threads on a rotatably supported worm gear. The housing has a slot adjacent the teeth on the worm, and the slot receives a sliding clamping shoe having an inner curved surface conforming to the outer surfaces of the worm teeth for contacting the teeth. The clamping shoe has a cross slot which receives an eccentric cam portion of a cross shaft rotably supported by the housing. The outer end portion of the cross shaft receives a lever which is pivotally connected to a fluid actuated cylinder. After the worm drives the worm gear and the connected shaft or member to a selected position, the fluid cylinder is actuated to force the clamping shoe radially inwardly so that the worm teeth are pressed radially against the worm gear teeth with substantial pressure thereby locking the worm gear and preventing any rotation of the worm gear, especially when subjected to vibration.

Other features and advantages of the invention will be apparent from the following description, the accompanying drawing and the appended claims.

BRIEF DESCRIPTION OF THE DRAWING

FIG. 1 is a top view of a worm gear drive constructed in accordance with the invention;

FIG. 2 is a somewhat enlarged fragmentary section taken generally on the line 2—2 of FIG. 1; and FIG. 3 is a fragmentary section taken generally on the line 3—3 of FIG. 1.

DESCRIPTION OF THE PREFERRED EMBODIMENT

Referring to FIGS. 1–3, a worm gear 10 is mounted or connected to a rotatable member or shaft 12 and has precisely machined peripherally spaced helical worm teeth 14. The outer surfaces of the helical teeth 14 form a laterally concaved peripheral surface for the worm gear 10, and the teeth 14 interfit or mesh with corresponding mating helical teeth 16 forming an hour-glass worm portion 18 on a rotatable worm or worm shaft 20. A housing 22 rotatably supports the worm shaft 20 by means of an anti-friction needle bearing 24 retained in one end portion of the housing 22 by a retainer plate 26. The inner race of the bearing 24 is mounted on a reduced driven end portion 28 of the worm shaft 20, and a keyway 29 provides for connecting the end portion 28 to the shaft of a motor drive unit (not shown).

The worm shaft 20 has a reduced opposite end portion 32 which is supported for rotation by a pair of anti-friction bearings 34 having inner races secured to the shaft portion 32 by a lock nut 36. A plug-type cap 42 is threaded into the end portion of the housing 22 for closing the end portion and for retaining the outer races of the bearings 34. The housing 22 is mounted for lateral adjustment relative to the worm gear 10 by a set of screws 43 extending within slots 44 to minimize the preset clearance between the teeth 14 and 16.

In accordance with the present invention, a rectangular block-like clamping shoe 45 is supported for sliding movement within a rectangular slot 48 formed within the housing 22 opposite the worm gear 10. The clamping shoe 45 has a compound curved inner surface 52 which conforms to the outer surface of the worm teeth 16 and is therefore convex in a longitudinal direction, as shown in FIG. 2, and concaved in a lateral direction. The clamping shoe 45 has a laterally extending cam slot 54 which receives an eccentric cam portion 56 of a laterally extending cross shaft 58 rotatably supported within a stepped cross bore extending laterally within the housing 22. The shaft 58 has an outwardly projecting reduced end portion 62 (FIG. 1) on which is mounted the split end portion of a lever 64 which is locked to the shaft end portion 62 by a key (not shown) and a clamping screw 66. The lever 64 has parallel spaced outer end portions 68 (FIGS. 1 and 3) which receive therebetween a fitting 71 (FIG. 3) threaded to the outer end portion of a piston rod 73 extending from a fluid or pneumatic cylinder 75. The opposite end portion of the cylinder 75 has a plate 78 which is pivotally supported by a yoke-type fitting 81 and a cross pin 82. The fitting 81 is supported by a bracket 84 and permits the cylinder 75 to pivot slightly when it is actuated to rotate or oscillate the shaft 58.

In operation of the apparatus or system for locking the worm gear drive in accordance with the invention, the clearance between the teeth 14 on the worm gear 10 and the teeth 16 on the worm 18 is preferably held between 0 and 0.002 inch as a result of precision machining of the teeth 14 and 16 and the precision position of the worm 18 relative to the rotatable member or shaft 12. After the worm shaft 20 is rotated, for example, by a numerically controlled motor until the member or shaft 12 is precisely positioned, the member or shaft 12 is locked by actuating the fluid cylinder 75 which rotates the shaft 58 and forces the clamping shoe 45 radially inwardly against the worm teeth 16.

The force exerted by the shoe 45 is sufficient to deflect or bow the worm gear 20, for example, by 0.003 to 0.004 inch, so that all of the worm teeth 16 are clamped against the worm gear teeth 14. As a result of the clamping action and the high mechanical advantage between the worm shaft 20 and the worm gear 10, the worm gear and the shaft 12 are locked and prevented from rotating during the cutting operation by the machine tool head rigidly connected to the shaft 12. After the machining operation is completed and it is desired to rotate the shaft 12 and the connected machine tool head, the clamping shoe 45 is released and shifted to its released position by actuating the fluid cylinder 75 to retract the piston rod 73. When the force exerted by the clamping shoe 45 released, the worm shaft 20 is again free to be rotated for rotating the worm gear 10 and its supporting shaft or member 12.

It is apparent from the drawing and the above description that the locking apparatus of the invention is simple, compact, light weight and economical in construction and has a minimum number of parts or elements. The apparatus is also highly rigid, operates quickly and precisely locks the worm gear 10 at its selected position without shifting the worm gear. The locking apparatus not only eliminates any backlash between the worm and the worm gear when the threads are locked, but also prevents any movement of the worm gear 10 due to vibration of the machine component or cutting tool head, and is unaffected by wear of any part.

While the form of locking apparatus herein described constitutes a preferred embodiment of the invention, it is to be understood that the invention is not limited to this precise form of apparatus, and that changes may be made therein without departing from the scope and spirit of the invention as defined in the appended claims.

The invention having thus been described, the following is claimed:

1. Apparatus for locking a worm gear drive including a worm having teeth engaging mating teeth on a worm gear, said apparatus comprising a support member supporting said worm for rotation, a clamping shoe positioned adjacent said teeth on said worm and opposing said worm gear with said worm therebetween, means supporting said clamping shoe for movement between a released position providing for rotation of said worm and a clamping position engaging said teeth on said worm and pressing said teeth on said worm into said teeth on said worm gear, and a power actuated member connected to move said clamping shoe between said released position and said clamping position.

2. Apparatus as defined in claim 1 wherein said worm teeth have outer surfaces defining a curve configuration, and said clamping shoe has a correspondingly curved surface for engaging said outer surfaces of said teeth on said worm.

3. Apparatus as defined in claim 1 wherein said power actuated member comprises a rotatable cam member engaging said clamping shoe, and means for rotating said cam member.

4. Apparatus as defined in claim 1 wherein said support member rotatably supports a cam member, and said power actuated member comprises a lever connected to rotate said cam member.

5. Apparatus as defined in claim 1 wherein said worm is slightly bowed toward said worm gear in response to movement of said clamping shoe to said clamping position.

6. Apparatus as defined in claim 1 wherein said support member comprise a housing retaining a set of spaced bearings supporting said worm for rotation, and said housing defines a slot between said bearings and supporting said clamping shoe for said movement between said released and clamping positions.

7. Apparatus as defined in claim 1 wherein said clamping shoe defines a laterally extending hole, said power actuated member comprises a shaft supported for rotation by said support member and extending through said hole, and said shaft includes an eccentric cam portion within said hole for moving said clamping shoe in response to rotation of said shaft.

8. Apparatus as defined in claim 7 and including a fluid actuated cylinder connected to a lever mounted on said shaft for rotating said shaft and said cam portion to move said clamping shoe between said released and clamping positions in response to actuation of said cylinder.

9. Apparatus as defined in claim 1 wherein said worm has opposite end portions with said worm teeth therebetween, said support member comprises a housing rotatably supporting said end portions of said worm, and said clamping shoe is supported by said housing for said movement between said released and clamping positions.

10. Apparatus as defined in claim 1 wherein said teeth on said worm move laterally less than 0.005 inch in response to movement of said clamping shoe between said released and clamping positions.

11. Apparatus for locking a worm gear drive including a worm having teeth engaging mating teeth on a worm gear, said apparatus comprising a housing supporting said worm for rotation, a clamping shoe positioned adjacent said teeth on said worm and supported by said housing for movement between a released position providing for rotation of said worm and a clamping position engaging and pressing said teeth on said worm into said teeth on said worm gear, and a power actuated rotatable cam member connected to move said clamping shoe from said released position to said clamping position for slightly deflecting said worm toward said worm gear.

12. Apparatus as defined in claim 11 wherein said worm teeth have outer surfaces defining a curved configuration, and said clamping shoe has a correspondingly curved surface for engaging said outer surfaces of said teeth on said worm.

13. Apparatus as defined in claim 11 and including a fluid actuated lever mechanism for rotating said cam member.

14. Apparatus as defined in claim 11 wherein said housing retains a set of spaced bearings supporting said worm for rotation, and said housing defines a slot between said bearings and supporting said clamping shoe for said movement between said released and clamping positions.

15. Apparatus as defined in claim 11 wherein said clamping shoe defines a laterally extending hole, said power actuated cam member comprises a shaft supported for rotation by said housing and extending through said hole, and said shaft includes an eccentric cam portion within said hole for moving said clamping shoe in response to rotation of said shaft.

16. Apparatus as defined in claim 15 and including a fluid actuated cylinder connected to a lever mounted on said shaft for rotating said shaft and said cam portion to move said clamping shoe between said released and clamping positions in response to actuation of said cylinder.

17. Apparatus as defined in claim 11 wherein said teeth on said worm move laterally less than 0.005 inch in response to movement of said clamping shoe between said released and clamping positions.

* * * * *